(12) United States Patent
Lokshin et al.

(10) Patent No.: US 7,945,386 B2
(45) Date of Patent: May 17, 2011

(54) REROUTING IN VEHICLE NAVIGATION SYSTEMS

(75) Inventors: Anatole M. Lokshin, Huntington Beach, CA (US); Karunanidhi Upparapalli, Diamond Bar, CA (US)

(73) Assignee: Mitac International Corporation, Kuei San Hsiang, Taoyuan (TW)

( * ) Notice: Subject to any disclaimer, the term of this patent is extended or adjusted under 35 U.S.C. 154(b) by 936 days.

(21) Appl. No.: 11/844,321

(22) Filed: Aug. 23, 2007

(65) Prior Publication Data

US 2008/0051995 A1 Feb. 28, 2008

Related U.S. Application Data

(60) Provisional application No. 60/840,035, filed on Aug. 25, 2006.

(51) Int. Cl.
*G01C 21/34* (2006.01)
(52) U.S. Cl. .... 701/210; 701/208; 701/209; 340/995.19
(58) Field of Classification Search .......... 701/210–213, 701/208, 209, 207, 215; 340/995.13, 995.19, 340/995.16, 990
See application file for complete search history.

(56) References Cited

U.S. PATENT DOCUMENTS

| | | | |
|---|---|---|---|
| 5,515,283 A | 5/1996 | Desai et al. |
| 5,802,492 A | 9/1998 | DeLorme et al. |
| 6,049,755 A | 4/2000 | Lou et al. |
| 6,067,502 A | 5/2000 | Hayashida et al. |
| 6,078,864 A | 6/2000 | Long et al. |
| 6,081,609 A | 6/2000 | Narioka |
| 6,084,989 A | 7/2000 | Eppler |
| 6,092,076 A | 7/2000 | McDonough et al. |
| 6,107,944 A | 8/2000 | Behr et al. |
| 6,108,603 A | 8/2000 | Karunanidhi |
| 6,108,604 A | 8/2000 | Fukaya et al. |
| 6,115,669 A | 9/2000 | Watanabe et al. |
| 6,124,826 A | 9/2000 | Garthwaite et al. |

(Continued)

FOREIGN PATENT DOCUMENTS

EP 1471330 A 10/2004

(Continued)

OTHER PUBLICATIONS

Transaction History of U.S. Appl. No. 12/195,152, filed Aug. 20, 2008, entitled "Systems and Methods for Smart City Search."

(Continued)

*Primary Examiner* — Richard M. Camby
(74) *Attorney, Agent, or Firm* — Winston Hsu; Scott Margo (57) ABSTRACT

A navigation device includes a processor, a map information storage medium storing map information, a position determining module configured to determine a current location, a velocity and direction of travel of a vehicle, and determine whether the current position indicates a deviation from an original route to a final destination. Further included is a routing module configured to determine an original route from a starting position to a destination, and at least one reroute from the current location to the destination, wherein the reroute includes a restoration route from the current location to at least one intermediate point on the original route and then continuing to the destination. Based upon an estimated cost of the restoration route plus a predetermined actual cost of the route from the intermediate point to the final destination, the routing module is further configured to estimate a reroute cost, and select a reroute based upon the estimated reroute cost.

14 Claims, 3 Drawing Sheets

U.S. PATENT DOCUMENTS

| | | |
|---|---|---|
| 6,125,326 A | 9/2000 | Ohmura et al. |
| 6,141,621 A | 10/2000 | Piwowarski et al. |
| 6,148,261 A | 11/2000 | Obradovich et al. |
| 6,151,552 A | 11/2000 | Koizumi et al. |
| 6,154,699 A | 11/2000 | Williams |
| 6,163,269 A | 12/2000 | Millington et al. |
| 6,172,641 B1 | 1/2001 | Millington |
| 6,175,801 B1 | 1/2001 | Millington |
| 6,177,943 B1 | 1/2001 | Margolin |
| 6,178,380 B1 | 1/2001 | Millington |
| 6,184,823 B1 | 2/2001 | Smith et al. |
| 6,189,130 B1 | 2/2001 | Gofman et al. |
| 6,201,540 B1 | 3/2001 | Gallup et al. |
| 6,204,778 B1 | 3/2001 | Bergan et al. |
| 6,205,397 B1 | 3/2001 | Eslambolchi et al. |
| 6,212,474 B1 | 4/2001 | Fowler et al. |
| 6,223,118 B1 | 4/2001 | Kobayashi et al. |
| 6,229,546 B1 | 5/2001 | Lancaster et al. |
| 6,249,740 B1 | 6/2001 | Ito et al. |
| 6,253,151 B1 | 6/2001 | Ohler et al. |
| 6,256,029 B1 | 7/2001 | Millington |
| 6,278,942 B1 | 8/2001 | McDonough |
| 6,308,134 B1 | 10/2001 | Croyle et al. |
| 6,320,517 B1 | 11/2001 | Yano et al. |
| 6,321,158 B1 | 11/2001 | DeLorme et al. |
| 6,349,257 B1 | 2/2002 | Liu et al. |
| 6,356,210 B1 | 3/2002 | Ellis |
| 6,360,167 B1 | 3/2002 | Millington et al. |
| 6,362,751 B1 | 3/2002 | Upparapalli |
| 6,363,322 B1 | 3/2002 | Millington |
| 6,370,475 B1 | 4/2002 | Breed et al. |
| 6,377,278 B1 | 4/2002 | Cutright et al. |
| 6,381,536 B1 | 4/2002 | Satoh et al. |
| 6,385,535 B2 | 5/2002 | Ohishi et al. |
| 6,385,542 B1 | 5/2002 | Millington |
| 6,397,145 B1 | 5/2002 | Millington |
| 6,405,130 B1 | 6/2002 | Piwowarski |
| 6,408,243 B1 | 6/2002 | Yofu |
| 6,427,115 B1 | 7/2002 | Sekiyama |
| 6,430,501 B1 | 8/2002 | Slominski |
| 6,453,235 B1 | 9/2002 | Endo et al. |
| 6,484,089 B1 | 11/2002 | Millington |
| 6,487,494 B2 | 11/2002 | Odinak et al. |
| 6,515,595 B1 | 2/2003 | Obradovich et al. |
| 6,529,822 B1 | 3/2003 | Millington et al. |
| 6,529,824 B1 | 3/2003 | Obradovich et al. |
| 6,539,301 B1 | 3/2003 | Shirk |
| 6,542,814 B2 | 4/2003 | Polidi et al. |
| 6,565,610 B1 | 5/2003 | Wang et al. |
| 6,574,551 B1 | 6/2003 | Maxwell et al. |
| 6,609,062 B2 | 8/2003 | Hancock |
| 6,631,322 B1 | 10/2003 | Arthur et al. |
| 6,671,617 B2 | 12/2003 | Odinak et al. |
| 6,704,649 B2 | 3/2004 | Miyahara |
| 6,728,608 B2 | 4/2004 | Ollis et al. |
| 6,728,636 B2 | 4/2004 | Kokojima et al. |
| 6,748,323 B2 | 6/2004 | Lokshin et al. |
| 6,765,554 B2 | 7/2004 | Millington |
| 6,774,932 B1 | 8/2004 | Ewing |
| 6,782,319 B1 | 8/2004 | McDonough |
| 6,816,596 B1 | 11/2004 | Peinado et al. |
| 6,819,301 B2 | 11/2004 | Nagamatsu et al. |
| 6,842,695 B1 | 1/2005 | Tu |
| 6,873,907 B1 | 3/2005 | Millington et al. |
| 6,885,874 B2 | 4/2005 | Grube et al. |
| 6,917,982 B1 | 7/2005 | Dueck et al. |
| 6,938,028 B1 | 8/2005 | Ito |
| 7,031,834 B2 | 4/2006 | Ito et al. |
| 7,031,836 B2 | 4/2006 | Branch |
| 7,058,504 B2 | 6/2006 | McDonough et al. |
| 7,170,518 B1 | 1/2007 | Millington et al. |
| 7,233,860 B2 | 6/2007 | Lokshin et al. |
| 7,260,475 B2 | 8/2007 | Suzuki |
| 7,321,826 B2 | 1/2008 | Sheha et al. |
| 7,333,820 B2 | 2/2008 | Sheha et al. |
| 7,343,242 B2 | 3/2008 | Breitenberger et al. |
| 7,353,107 B2 | 4/2008 | Breitenberger et al. |
| 7,379,812 B2 | 5/2008 | Yoshioka et al. |
| 7,395,149 B2 * | 7/2008 | Matsumoto et al. .......... 701/207 |
| 7,421,334 B2 | 9/2008 | Dahlgren |
| 7,512,487 B1 | 3/2009 | Golding et al. |
| 7,546,202 B2 | 6/2009 | Oh |
| 7,590,490 B2 | 9/2009 | Clark |
| 7,634,356 B2 * | 12/2009 | Oguchi et al. ................ 701/210 |
| 2001/0018628 A1 | 8/2001 | Jenkins et al. |
| 2002/0151315 A1 | 10/2002 | Hendrey |
| 2003/0036842 A1 | 2/2003 | Hancock |
| 2003/0036848 A1 | 2/2003 | Sheha et al. |
| 2003/0167120 A1 | 9/2003 | Kawasaki |
| 2003/0182052 A1 | 9/2003 | DeLorme et al. |
| 2003/0191578 A1 | 10/2003 | Paulauskas et al. |
| 2004/0039520 A1 | 2/2004 | Khavakh et al. |
| 2005/0107948 A1 | 5/2005 | Catalinotto |
| 2006/0080031 A1 | 4/2006 | Cooper et al. |
| 2006/0089788 A1 | 4/2006 | Laverty |
| 2006/0106534 A1 | 5/2006 | Kawamata et al. |
| 2006/0212217 A1 | 9/2006 | Sheha et al. |
| 2006/0265422 A1 | 11/2006 | Ando et al. |
| 2007/0027628 A1 | 2/2007 | Geelen |
| 2007/0073480 A1 | 3/2007 | Singh |
| 2007/0088494 A1 | 4/2007 | Rothman et al. |
| 2007/0130153 A1 | 6/2007 | Nachman et al. |
| 2007/0204218 A1 | 8/2007 | Weber et al. |
| 2007/0213929 A1 | 9/2007 | Tanizaki et al. |
| 2007/0233384 A1 | 10/2007 | Lee et al. |
| 2008/0076451 A1 | 3/2008 | Sheha et al. |
| 2008/0125958 A1 | 5/2008 | Boss et al. |
| 2008/0133120 A1 | 6/2008 | Romanick |
| 2008/0134088 A1 | 6/2008 | Tse et al. |
| 2008/0177470 A1 | 7/2008 | Sutardja |
| 2008/0270016 A1 | 10/2008 | Proietty et al. |
| 2009/0138190 A1 | 5/2009 | Kulik |
| 2009/0150064 A1 | 6/2009 | Geelen |
| 2009/0171584 A1 | 7/2009 | Liu |
| 2009/0182498 A1 | 7/2009 | Seymour |
| 2009/0182500 A1 | 7/2009 | Dicke |
| 2009/0187340 A1 | 7/2009 | Vavrus |
| 2009/0187341 A1 | 7/2009 | Vavrus |
| 2009/0187342 A1 | 7/2009 | Vavrus |

FOREIGN PATENT DOCUMENTS

| | | |
|---|---|---|
| JP | 2001194172 | 7/2001 |
| JP | 2002048574 | 2/2002 |
| JP | 2006250875 | 9/2006 |
| JP | 2007155582 | 6/2007 |
| JP | 2007178182 | 7/2007 |
| JP | 2008002978 | 1/2008 |
| KR | 19990011004 | 2/1999 |
| KR | 19990040849 | 6/1999 |
| KR | 20020084716 | 11/2002 |
| KR | 20040106688 | 12/2004 |
| KR | 20070080726 | 8/2007 |

OTHER PUBLICATIONS

Transaction History U.S. Appl. No. 61/122,640, filed Dec. 15, 2008, entitled "Systems and Methods for Providing Global Navigation Satellite System Assisted Maneuvering Guidance to a Vehicle Operator."

International Patent Application No. PCT/US2008/084659, Written Opinion and International Search Report, Apr. 28, 2009.

International Patent Application No. PCT/US2009/030177, Written Opinion and International Search Report, Apr. 29, 2009.

International Patent Application No. PCT/US2009/030314, Written Opinion and International Search Report, May 25, 2009.

Shamir, Adi et al., "Playing 'Hide and Seek' with Stored Keys," Lecture Notes in Computer Science, vol. 1648, 1991, pp. 118-124.

Transaction History of related U.S. Appl. No. 08/691,663, filed Aug. 2, 1996, entitled "Method Providing a Textual Description of a Remote Vehicle Location," now U.S. Patent No. 6,141,621.

Transaction History of related U.S. Appl. No. 08/691,727, filed Aug. 2, 1996, entitled "System and Method for Controlling a Vehicle Emergency Response Network," now U.S. Patent No. 6,539,301.

Transaction History of related U.S. Appl. No. 08/710,473, filed Sep. 18, 1996, entitled "Navigation Simulator and Recorder," now U.S. Patent No. 5,922,041.

Transaction History of related U.S. Appl. No. 08/713,625, filed Sep. 13, 1996, entitled "Navigation System With Vehicle Service Information," now U.S. Patent No. 5,819,201.
Transaction History of related U.S. Appl. No. 08/713,627, filed Sep. 13, 1996, entitled "Navigation System With User Definable Cost Values," now U.S. Patent No. 5,878,368.
Transaction History of related U.S. Appl. No. 08/762,012, filed Dec. 11, 1996, entitled "Navigation System With Forward Looking Origin Selection for Route Re-Calculation," now U.S. Patent No. 6,405,130.
Transaction History of related U.S. Appl. No. 09/037,772, filed Mar. 10, 1998, entitled "Navigation System Character Input Device," now U.S. Patent No. 6,037,942.
Transaction History of related U.S. Appl. No. 09/056,218, filed Apr. 7, 1998, entitled "Navigation System using Position Network for Map Matching," now U.S. Patent No. 6,108,603.
Transaction History of related U.S. Appl. No. 09/062,518, filed Apr. 17, 1998, entitled "3-Dimensional Intersection Display for Vehicle Navigation System," now U.S. Patent No. 6,611,753.
Transaction History of related U.S. Appl. No. 09/096,103, filed Jun. 11, 1998, entitled "Navigation System With a Route Exclusion List System," now U.S. Patent No. 6,362,751.
Transaction History of related U.S. Appl. No. 09/099,963, filed Jun. 19, 1998, entitled "Autoscaling of Recommended Route," now U.S. Patent No. 6,574,551.
Transaction History of related U.S. Appl. No. 09/100,683, filed Jun. 19, 1998, entitled "Navigation System Map Panning Directional Indicator," now U.S. Patent No. 6,175,801.
Transaction History of related U.S. Appl. No. 09/114,670, filed Jul. 13, 1998, entitled "Navigation System Vehicle Location Display," now U.S. Patent No. 6,049,755.
Transaction History of related U.S. Appl. No. 09/118,030, filed Jul. 17, 1998, entitled "Navigation System With Predetermined Indication of Next Maneuver," now U.S. Patent No. 6,078,684.
Transaction History of related U.S. Appl. No. 09/160,068, filed Sep. 24, 1998, entitled "Navigation System With Anti-Alias Map Display," now U.S. Patent No. 6,163,269.
Transaction History of related U.S. Appl. No. 09/176,630, filed Oct. 22, 1998, entitled "Street Identification for a Map Zoom of a Navigation System," now U.S. Patent No. 6,178,380.
Transaction History of related U.S. Appl. No. 09/239,692, filed Jan. 29, 1999, entitled "Vehicle Navigation System With Location Based Multi-Media Annotation," now U.S. Patent No. 6,360,167.
Transaction History of related U.S. Appl. No. 09/418,749, filed Oct. 15, 1999, entitled "Navigation System With Road Condition Sampling," now U.S. Patent No. 6,484,089.
Transaction History of related U.S. Appl. No. 09/435,381, filed Nov. 5, 1999, entitled "Navigation System Character Input Device," now U.S. Patent No. 6,765,554.
Transaction History of related U.S. Appl. No. 09/470,438, filed Dec. 22, 1999, entitled "Navigation System With All Character Support," now U.S. Patent No. 6,256,029.
Transaction History of related U.S. Appl. No. 09/470,441, filed Dec. 22, 1999, entitled "Navigation System With Unique Audio Tones for Maneuver Notification," now U.S. Patent No. 6,363,322.
Transaction History of related U.S. Appl. No. 09/487,654, filed Jan. 19, 2000, entitled "Navigation System With Route Indicators," now U.S. Patent No. 6,430,501.
Transaction History of related U.S. Appl. No. 09/519,143, filed Mar. 6, 2000, entitled "Navigation System With Complex Maneuver Instruction," now U.S. Patent No. 6,397,145.
Transaction History of related U.S. Appl. No. 09/535,733, filed Mar. 27, 2000, entitled "Selective Rendering of Cartographic Entities for Navigation System," now U.S. Patent No. 7,170,518.
Transaction History of related U.S. Appl. No. 09/547,004, filed Apr. 11, 2000, entitled "Navigation System With Zoomed Maneuver Instruction," now U.S. Patent No. 6,529,822.
Transaction History of related U.S. Appl. No. 09/661,982, filed Sep. 18, 2000, entitled "Points of Interest for Navigation System," now U.S. Patent No. 6,374,180.
Transaction History of related U.S. Appl. No. 09/679,671, filed Oct. 5, 2000, entitled "Navigation System With Run-Time Training Instruction," now abandoned.
Transaction History of related U.S. Appl. No. 09/691,531, filed Oct. 18, 2000, entitled "Multiple Configurations for a Vehicle Navigation System," now U.S. Patent No. 6,385,542.
Transaction History of related U.S. Appl. No. 09/799,876, filed Mar. 6, 2001, entitled "Navigation System With Figure of Merit Determination," now U.S. Patent No. 6,741,928.
Transaction History of related U.S. Appl. No. 10/088,017, filed Sep. 9, 2002, entitled "Navigation System With User Interface," now U.S. Patent No. 6,873,907.
Transaction History of related U.S. Appl. No. 10/208,261, filed Jul. 31, 2002, entitled "Displaying Data," now U.S. Patent No. 6,748,323.
Transaction History of related U.S. Appl. No. 10/619,619, filed Jul. 16, 2003, entitled "Intelligent Modular Navigation Information Capability," now U.S. Patent No. 7,233,860.
Transaction History of related U.S. Appl. No. 11/327,450, filed Jan. 9, 2006, entitled "Smart Detour".
Transaction History of related U.S. Appl. No. 11/518,205, filed Sep. 11, 2006, entitled "Method and System of Securing Content and Destination of Digital Download Via the Internet."
Transaction History of related U.S. Appl. No. 11/675,817, filed Feb. 16, 2007, entitled "A Method of Generating Curved Baseline for Map Labeling."
Transaction History of related U.S. Appl. No. 11/684,301, filed Mar. 9, 2007, entitled "Method and Apparatus for Determining a Route Having an Estimated Minimum Fuel Usage for a Vehicle."
Transaction History of related U.S. Appl. No. 11/737,125, filed Apr. 18, 2007, entitled "Method and System Navigation Using GPS Velocity Vector."
Transaction History of related U.S. Appl. No. 11/740,280, filed Apr. 25, 2007, entitled "Adjusting Spatial Operations Based on Map Density."
Transaction History of related U.S. Appl. No. 11/840,610, filed Aug. 17, 2007, entitled "Methods and Apparatus for Measuring the Effectiveness of Advertisements Presented on a Mobile Navigation Device."
Transaction History of related U.S. Appl. No. 11/852,973, filed Sep. 10, 2007, entitled "Nearest Neighbor Geographic Search."
Transaction History of related U.S. Appl. No. 11/906,277, filed Oct. 1, 2007, entitled "Static and Dynamic Contours."
Transaction History of related U.S. Appl. No. 11/945,211, filed Nov. 26, 2007, entitled "System and Method of Providing Traffic Data to a Mobile Device."
Transaction History of related U.S. Appl. No. 11/967,889, filed Jan. 1, 2008, entitled "System and Method for Accessing a Navigation System."
Transaction History of related U.S. Appl. No. 12/013,384, filed Jan. 11, 2008, entitled "System and Method to Provide Navigational Assistance Using an Online Social Network."
Transaction History of related U.S. Appl. No. 12/016,949, filed Jan. 18, 2008, entitled "Method and Apparatus for Hybrid Routing Using Breadcrumb Paths."
Transaction History of related U.S. Appl. No. 12/016,980, filed Jan. 18, 2008, entitled "Method and Apparatus to Search for Local Parking."
Transaction History of related U.S. Appl. No. 12/016,982, filed Jan. 18, 2008, entitled "Method and Apparatus for Access Point Recording Using a Position Device."
Transaction History of related U.S. Appl. No. 12/188,139, filed Aug. 7, 2008, entitled "System and Method to Record a Present Trip."
Transaction History of related U.S. Appl. No. 12/192,018, filed Aug. 14, 2008, entitled "Route Navigation via a Proximity Point."
Transaction History of related U.S. Appl. No. 12/195,152, filed Aug. 20, 2008, entitled "Systems and Methods for Smart City Search."
Jagadeesh, G.R. et al., "Heuristic Techniques for Accelerating Hierarchical Routing on Road Networks", IEEE Transactions on Intelligent Transportation Systems, IEEE Service Center, Piscataway, NEw Jersey, US, vol. 3, No. 4, Dec. 1, 2002, XP011074894, ISSN: 1524-9050, p. 307.
PCT/US07/76733—International Search Report (mailed Jun. 20, 2008).
PCT/US07/76733—Written Opinion (mailed Jun. 20, 2008).

International Patent Application Serial no. PCT/US2009/030176, Written Opinion and International Search Report, mailed Sep. 1, 2009.

USPTO Tranaction History of related U.S. Appl. No. 08/691,663, filed Aug. 2, 1996, entitled "Method Providing a Textual Description of a Remote Vehicle Location," now U.S. Patent No. 6,141,621.

USPTO Transaction History of related U.S. Appl. No. 08/691,727, filed Aug. 2, 1996, entitled "System and Method for Controlling a Vehicle Emergency Response Network," now U.S. Patent No. 6,539,301.

USPTO Transaction History of related U.S. Appl. No. 08/710,473, filed Sep. 18, 1996, entitled "Navigation Simulator and Recorder," now U.S. Patent No. 5,922,041.

USPTO Transaction History of relatedd U.S. Appl. No. 08/713,625, filed Sep. 13, 1996, entitled "Navigation System With Vehicle Service Information," now U.S. Patent No. 5,819,201.

USPTO Transaction History of related U.S. Appl. No. 08/713,627, filed Sep. 13, 1996, entitled "Navigation System With User Definable Cost Values," now U.S. Patent No. 5,878,368.

USPTO Transaction History of related U.S. Appl. No. 08/762,012, filed Dec. 11, 1996, entitled "Navigation System With Forward Looking Origin Selection for Route Re-Calculation," now U.S. Patent No. 6,405,130.

USPTO Transaction History of related U.S. Appl. No. 09/037,772, filed Mar. 10, 1998, entitled "Navigation System Character Input Device," now U.S. Patent No. 6,037,942.

USPTO Transaction History of related U.S. Appl. No. 09/056,218, filed Apr. 7, 1998, entitled "Navigation System using Position Network for Map Matching," now U.S. Patent No. 6,108,603.

USPTO Transaction History of related U.S. Appl. No. 09/062,518, filed Apr. 17, 1998, entitled "3-Dimensional Intersection Display for Vehicle Navigation System," now U.S. Patent No. 6,611,753.

USPTO Transaction History of related U.S. Appl. No. 09/096,103, filed Jun. 11, 1998, entitled "Navigation System With a Route Exclusion List System," now U.S. Patent No. 6,362,751.

USPTO Transaction History of related U.S. Appl. No. 09/099,963, filed Jun. 19, 1998, entitled "Autoscaling of Recommended Route," now U.S. Patent No. 6,574,551.

USPTO Transaction History of related U.S. Appl. No. 09/100,683, filed Jun. 19, 1998, entitled "Navigation System Map Panning Directional Indicator," now U.S. Patent No. 6,175,801.

USPTO Transaction History of related U.S. Appl. No. 09/114,670, filed Jul. 13, 1998, entitled "Navigation System Vehicle Location Display," now U.S. Patent No. 6,049,755.

USPTO Transaction History of related U.S. Appl. No. 09/118,030, filed Jul. 17, 1998, entitled "Navigation System With Predetermined Indication of Next Maneuver," now U.S. Patent No. 6,078,684.

USPTO Transaction History of related U.S. Appl. No. 09/160,068, filed Sep. 24, 1998, entitled "Navigation System With Anti-Alias Map Display," now U.S. Patent No. 6,163,269.

USPTO Transaction History of related U.S. Appl. No. 09/176,630, filed Oct. 22, 1998, entitled "Street Identification for a Map Zoom of a Navigation System," now U.S. Patent No. 6,178,380.

USPTO Transaction History of related U.S. Appl. No. 09/239,692, filed Jan. 29, 1999, entitled "Vehicle Navigation System With Location Based Multi-Media Annotation," now U.S. Patent No. 6,360,167.

USPTO Transaction History of related U.S. Appl. No. 09/418,749, filed Oct. 15, 1999, entitled "Navigation System With Road Condition Sampling," now U.S. Patent No. 6,484,089.

USPTO Transaction History of related U.S. Appl. No. 09/435,381, filed Nov. 5, 1999, entitled "Navigation System Character Input Device," now U.S. Patent No. 6,765,554.

USPTO Transaction History of related U.S. Appl. No. 09/470,438, filed Dec. 22, 1999, entitled "Navigation System With All Character Support," now U.S. Patent No. 6,256,029.

USPTO Transaction History of related U.S. Appl. No. 09/470,441, filed Dec. 22, 1999, entitled "Navigation System With Unique Audio Tones for Maneuver Notification," now U.S. Patent No. 6,363,322.

USPTO Transaction History of related U.S. Appl. No. 09/487,654, filed Jan. 19, 2000, entitled "Navigation System With Route Indicators," now U.S. Patent No. 6,430,501.

USPTO Transaction History of related U.S. Appl. No. 09/519,143, filed Mar. 6, 2000, entitled "Navigation System With Complex Maneuver Instruction," now U.S. Patent No. 6,397,145.

USPTO Transaction History of related U.S. Appl. No. 09/535,733, filed Mar. 27, 2000, entitled "Selective Rendering of Cartographic Entities for Navigation System," now U.S. Patent No. 7,170,518.

USPTO Transaction History of related U.S. Appl. No. 09/547,004, filed Apr. 11, 2000, entitled "Navigation System With Zoomed Maneuver Instruction," now U.S. Patent No. 6,529,822.

USPTO Transaction History of related U.S. Appl. No. 09/661,982, filed Sep. 18, 2000, entitled "Points of Interest for Navigation System," now U.S. Patent No. 6,374,180.

USPTO Transaction History of related U.S. Appl. No. 09/679,671, filed Oct. 5, 2000, entitled "Navigation System With Run-Time Training Instruction," now abandoned.

USPTO Transaction History of related U.S. Appl. No. 09/691,531, filed Oct. 18, 2000, entitled "Multiple Configurations for a Vehicle Navigation System," now U.S. Patent No. 6,385,542.

USPTO Transaction History of related U.S. Appl. No. 09/799,876, filed Mar. 6, 2001, entitled "Navigation System With Figure of Merit Determination," now U.S. Patent No. 6,741,928.

USPTO Transaction History of related U.S. Appl. No. 10/088,017, filed Sep. 9, 2002, entitled "Navigation System With User Interface," now U.S. Patent No. 6,873,907.

USPTO Transaction History of related U.S. Appl. No. 10/208,261, filed Jul. 31, 2002, entitled "Displaying Data," now U.S. Patent No. 6,748,323.

USPTO Transaction History of related U.S. Appl. No. 10/619,619, filed Jul. 16, 2003, entitled "Intelligent Modular Navigation Information Capability," now U.S. Patent No. 7,233,860.

USPTO Transaction History of related U.S. Appl. No. 11/327,450, filed Jan. 9, 2006, entitled "Smart Detour."

USPTO Transaction History of related U.S. Appl. No. 11/518,205, filed Sep. 11, 2006, entitled "Method and System of Securing Content and Destination of Digital Download Via the Internet."

USPTO Transaction History of related U.S. Appl. No. 11/675,817, filed Feb. 16, 2007, entitled "A Method of Generating Curved Baseline for Map Labeling."

USPTO Transaction History of related U.S. Appl. No. 11/684,301, filed Mar. 9, 2007, entitled. "Method and Apparatus For Determining a Route Having an Estimated Minimum Fuel Usage for a Vehicle."

USPTO Transaction History of related U.S. Appl. No. 11/737,125, filed Apr. 18, 2007, entitled "Method and System Navigation Using GPS Velocity Vector."

USPTO Transaction History of related U.S. Appl. No. 11/740,280, filed Apr. 25, 2007, entitled "Adjusting Spatial Operations Based on Map Density."

USPTO Transaction History of related U.S. Appl. No. 11/840,610, filed Aug. 17, 2007, entitled "Methods and Apparatus for Measuring the Effectiveness of Advertisements Presented on a Mobile Navigation Device."

USPTO Transaction History of related U.S. Appl. No. 11/852,973, filed Sep. 10, 2007, entitled "Nearest Neighbor Geographic Search."

USPTO Transaction History of related U.S. Appl. No. 11/906,277, filed Oct. 1, 2007, entitled "Static and Dynamic Contours."

USPTO Transaction History of related U.S. Appl. No. 11/945,211, filed Nov. 26, 2007, entitled "System and Method of Providing Traffic Data to a Mobile Device."

USPTO Transaction History of related U.S. Appl. No. 11/967,889, filed Jan. 1, 2008, entitled. "System and Method for Accessing a Navigation System."

USPTO Transaction History of related U.S. Appl. No. 12/013,384, filed Jan. 11, 2008, entitled "System and Method to Provide Navigational Assistance Using an Online Social Network."

USPTO Transaction History of related U.S. Appl. No. 12/016,949, filed Jan. 18, 2008, entitled "Method and Apparatus for Hybrid Routing Using Breadcrumb Paths."

USPTO Transaction History of related U.S. Appl. No. 12/016,980, filed Jan. 18, 2008, entitled "Method and Apparatus to Search for Local Parking."

USPTO Transaction History of related U.S. Appl. No. 12/016,982, filed Jan. 18, 2008, entitled "Method and Apparatus for Access Point Recording Using a Position Device."

USPTO Transaction History of related U.S. Appl. No. 12/188,139, filed Aug. 7, 2008, entitled "System and Method to Record a Present Trip."

USPTO Transaction History of related U.S. Appl. No. 12/192,018, filed Aug. 14, 2008, entitled "Route Navigation via a Proximity Point."

USPTO Transaction History of related U.S. Appl. No. 12/195,152, filed Aug. 20, 2008, entitled "Systems and Methods for Smart City Search."

* cited by examiner

REROUTING IN VEHICLE NAVIGATION SYSTEMS

CROSS REFERENCE TO RELATED APPLICATION

The present application claims priority to a provisional U.S. Patent Application Ser. No. 60/840,035, filed Aug. 25, 2006 and entitled "Rerouting of car navigation devices", the disclosure of which is hereby incorporated herein by reference.

FIELD

The present disclosure relates generally to vehicle navigation services for a computing device, and more specifically to a method and apparatus for rerouting after an initial routing is performed.

BACKGROUND

Global Navigation Satellite Systems (GNSS) allow navigation services including automatic route calculation from a current location to a destination location and guiding a driver of a vehicle to that destination with real time instructions in conjunction with a visual display of route segments as the vehicle progresses along the route.

The satellites transmit GPS signals comprising very precise location parameters and timing signals that are received by wireless device processors allowing a processor to determine their respective three dimensional positions and velocities.

A common car navigation system operates by computing an optimal route from the starting position to the desired destination point. The entire route is computed at once at the beginning of the routing and then the user is guided along the precomputed route.

Often, the user diverges from the original precomputed route, the result of an error to follow the guidance or as a user desired detour or by design. Such deviation is automatically detected by the auto routing system and in most cases a new route is computed. This is called auto-rerouting and in a majority of the cases a new route is computed following the same rule and the same algorithm as was used in the original route with the only difference that the new start point is the actual vehicle location at the time when the car navigation system determined that the user is off the original course.

Considering the processing time required to reroute from the current position to the destination after detection of a deviation from route, it is possible that a new route is determined only after the vehicle has passed the intersection. If this should happen, the driver will have passed the intersection without knowing the direction which should have been taken at the intersection in accordance with the search results. Therefore, the driver may well go in a direction different from the direction indicated by the search results and be further from the intended destination.

SUMMARY

One aspect of an apparatus and method of providing rerouting features is a navigation device that includes a processor, a map information storage medium storing map information, a position determining module configured to determine a current location, a velocity and direction of travel of a vehicle, and determine whether the current position indicates a deviation from an original route to a final destination. Further included is a routing module configured to determine an original route from a starting position to a destination, and at least one reroute from the current location to the destination, wherein the reroute includes a restoration route from the current location to at least one intermediate point on the original route and then continuing to the destination. Based upon an estimated cost of the restoration route plus a predetermined actual cost of the route from the intermediate point to the final destination, the routing module is further configured to estimate a reroute cost, and select a reroute based upon the estimated reroute cost.

Another aspect of the disclosed embodiments includes a method of determining a reroute after an off-route deviation. The method includes detecting a position of the vehicle, computing an original route for a vehicle from a starting point to a destination, detecting a current location that indicates a deviation from the original route, assigning an increased cost to turns within a predetermined distance of the current location, and selecting at least one intermediate point on the original route. Based upon this information, the navigation device includes the functionality of estimating a restoration route cost from the current location to each intermediate point using the increased cost assigned to turns within a predetermined distance of the current location, and estimating a total cost of each reroute from the current location to the destination, wherein each estimated reroute cost comprises the estimated restoration route cost plus an actual cost for the portion of the original route from the intermediate point associated with that reroute to the destination. Once at least one reroute is calculated, the device is configured to select a reroute from the at least one reroute, based upon the cost of each reroute, and perform map guidance functions based upon the selected reroute.

Another aspect of the disclosed embodiments includes a processor configured to perform the method disclosed above. In addition, another aspect includes a machine-readable medium comprising executable instructions stored thereon for causing the processor to perform the method disclosed above.

DETAILED DESCRIPTION OF THE EXEMPLARY EMBODIMENTS

Figure 1:
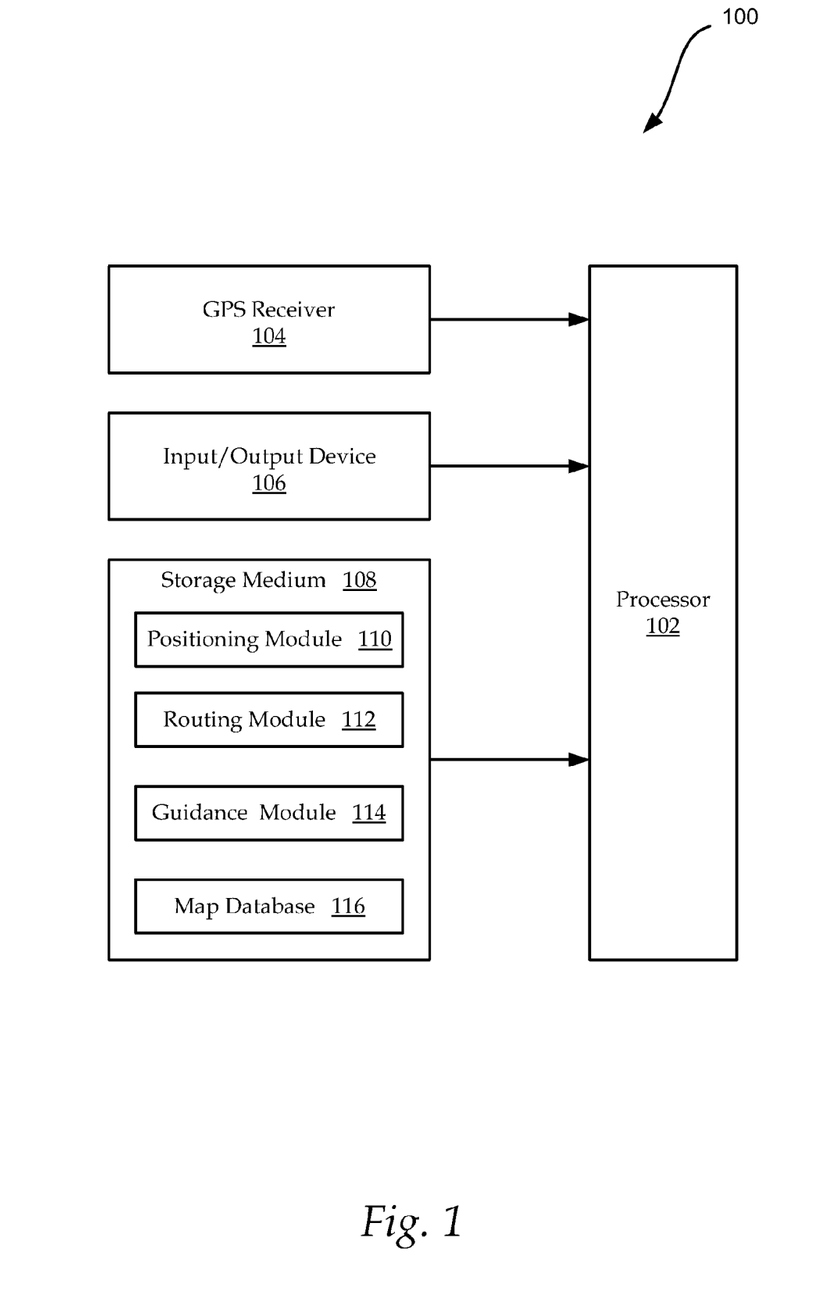
FIG. 1 is a block diagram of a navigation system that routes and reroutes according to the present invention.

FIG. 1 illustrates a block diagram of one embodiment of a navigation device 100 mounted in a vehicle and configured to compute an optimal route from a starting position to a desired destination, automatically detect when there is a deviation, either intentional or non-intentional, from the original route, and compute a reroute from the moving vehicle.

Device 100 determines a vehicle's current position by processing signals from GNSS satellites (such as GPS satellites), WAAS (wide area augmentation system) satellites or other position location satellites).

According to one embodiment, navigation device 100 comprises a receiver, i.e., GPS receiver 104, which receives a GPS signal containing GPS position location parameters from several satellites orbiting the earth at a distance of approximately 20,000 kilometers. Based upon the received parameters, a positioning module 110 stored in storage medium 108 provides the instructions that allows processor 102 to determine the three dimensional position and velocity of device 100 using very precise location parameters and timing signals received from the GPS satellites.

Furthermore, in some embodiments, navigation device 100 receives, over a cable or other communication means, velocity information from vehicle sensors, such as inertia sensors, including, a yaw gyroscope, an accelerometer, a magnetometer, and/or information received from vehicle hardware or data bus, such as, odometer pulses or the anti-lock breaking system (ABS) wheel speed information.

In some aspects, processor 102 is operable to control the operation of the device 100 based upon one or more stored application program stored in a storage medium 108. Processor 102 may comprise an application-specific integrated circuit (ASIC), or other chipset, processor, microprocessor, logic circuit, or other data processing device operable to perform one or more processing functions for device 100.

An input-output device 106 provides input functions for inputting a destination, for instructing the processing 102, responsive to a driver's input, to execute a navigation operation. In some embodiments, input-output device 106 further comprises a display device such as a CRT or a liquid crystal display operable to visually provide all information regarding navigation functions, including, but not limited to intersection picture screens, segment picture screens, and route setting screens based on guidance data and map data processed by processor 102. Other embodiments include a microphone for issuing voice commands and a speaker for providing audible instructions.

In some embodiments, storage medium 108 includes any type or any number of non-volatile memory, including read-only memory (ROM), random-access memory (RAM), EPROM, EEPROM, flash memory cells, secondary or tertiary storage devices, such as magnetic media, optical media, tape, or soft or hard disk, whether resident in device 100 or remote therefrom.

In addition to positioning module 110, storage medium 108 comprises a routing module 112 enabling processor 102 to calculate a best route between a user current location and a user specified destination based upon positioning information derived from positioning module 110 and a map database 116.

Map database 116 stores all the data necessary for operation of the navigation device 100, including, but not limited to map data, intersection data, node data, road data, photograph data, registered point data, destination point data, guidance point data, detailed destination data, destination name pronunciation data, phone number data, route segment cost data, etc.

Further still, guidance module 114 is operable to provide the user with real time directions to a user specified destination.

Figure 2:
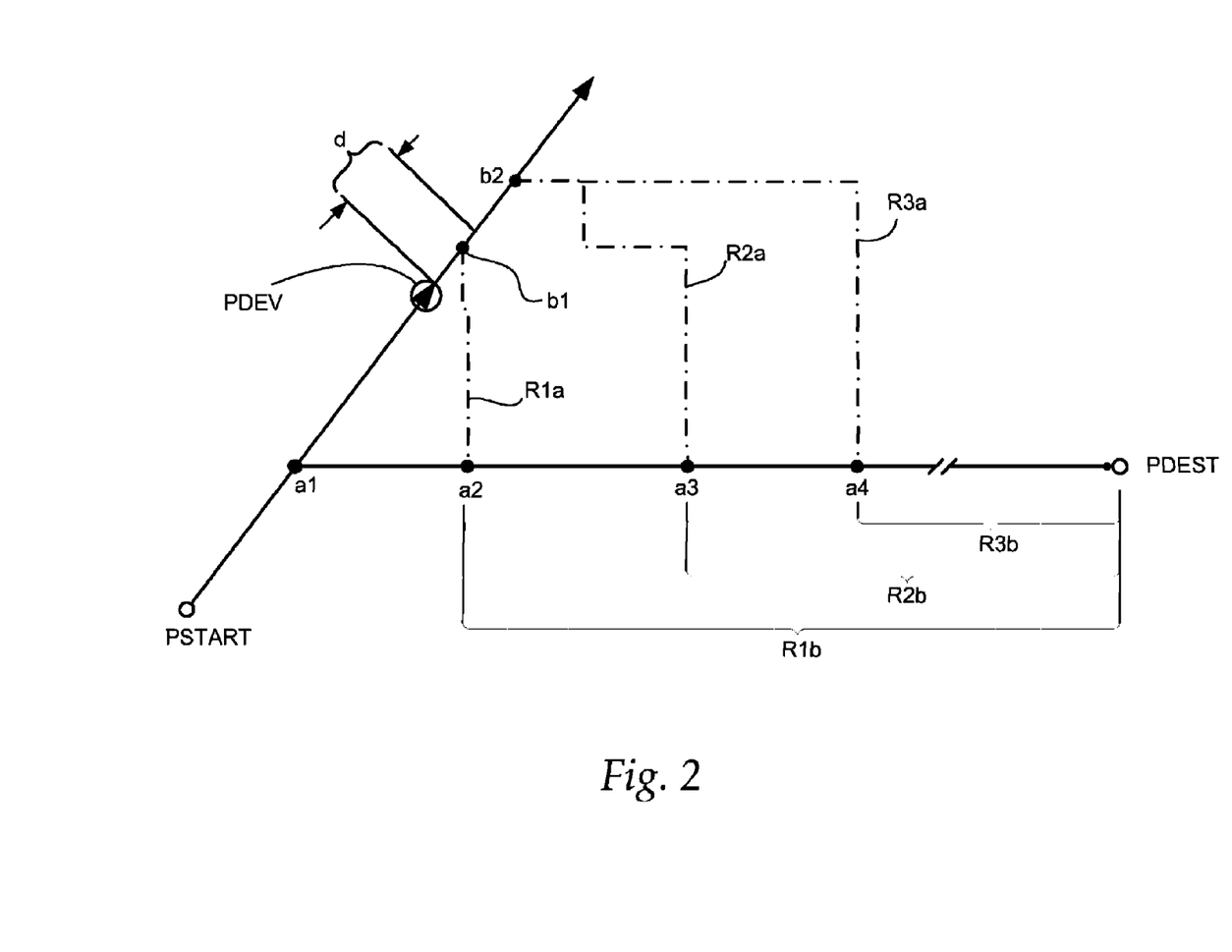
FIG. 2 illustrates a method of determining a reroute in the event of an off-route deviation, according to the system of FIG. 1.

FIG. 2 illustrates a method of determining a reroute, wherein navigation device 100 calculates an original route and then based upon partial rerouting, calculates a restoration route that returns the vehicle to the original route in the event of an off-route deviation. Using the input capabilities of input/output device 106, a user of device 100 enters a desired destination point PDEST.

Using satellite positioning data received from GPS receiver 104 positioning module 110, in conjunction with processor 102, device 100 determines starting position PSTART and calculates an original route from PSTART to a destination PDEST that include intermediate points a2, a3, and a4.

In the event of an off-route deviation at point a1, such that the vehicle is now at position PDEV, processor 100 responds by calculating a reroute based upon the routing algorithm stored in routing module 112 to determine at least one restoration route, e.g., R1a, R2a, and R3a, for returning the vehicle to an intermediate point, a2, a3, and a4, respectively, To come as close as possible to the optimal routing during partial rerouting without losing computational speed advantage, the costs of multiple restoration routes R1a, R2a, and R3a, are estimated to intermediate destinations a2, a3, and a4, respectively, where the restoration route merges with the original route. As an estimate value of the reroute a sum of a portion, e.g., R1b, R2b, or R3b, of the actual route cost that was previously computed for the original route, and an estimate of the possible cost of a route, e.g., R1a, R2a, or R3a, from the current position PDEV to an intermediate point, e.g., a2, a3, or a4, is used.

For example, when calculating a reroute cost from PDEV to intermediate point a3 and then continue along the original route from PSTART to the destination PDEST, a cost estimate for the reroute PDEV–a3–PDEST is computed as:

$$Est\_reroute\_cost(PDEV-a3-PDEST)=est\_cost(PDEV-a3)+actual\_cost(a3-PDEST)$$

where est_cost(PDEV–a3) is the estimated cost from PDEV to intermediate point a3; and actual_cost(a3–PDEST) is the actual route cost that was previously computed for the original route from intermediate point a3 to the destination PDEST.

In some embodiments, routing module 112 uses the known MANHATTAN DISTANCE function to easily and quickly compute the distance that would be traveled to get from one data point to the other if a grid-like path is followed. The MANHATTAN DISTANCE between two items is the sum of the differences of their corresponding components.

To estimate the cost for the route between the current position PDEV and an intermediate point, the corresponding MANHATTAN DISTANCE is normalized by the nominal speed for the class of roads that vehicle is traveling, or an average nominal speed between the nominal speed (vel_nominal) for the road class that the vehicle is traveling and the road class at the intermediate point. Accordingly, the estimated cost of a restoration route from PDEV to intermediate point a3 would be calculated as:

$$Est\_cost(PDEV-a3)=(abs(x(PDEV)-x(a3))+abs(y(PDEV)-y(a3)))/vel\_nominal$$

where x(PDEV) and y(PDEV) are the coordinates of the current position PDEV; x(a3) and y(a3) are the coordinates of the intermediate point a3; and vel_nominal is the nominal speed or an average nominal speed on the route between PDEV and a3.

However, the cost estimation is not limited to the methods illustrated above. Any other measure, say the actual distance or distance square, can be used as well. The cost estimate functions described above provide an optimal reroute optimized for the shortest amount of time. If the desired path is the shortest route, no velocity normalization is required.

In one embodiment, the rerouting and the cost estimation are performed on the device 100. Alternatively, the rerouting and the cost estimation can be performed on a server separated from the device 100. For example, the device 100 can transmit the current position to the server over a data communication channel and received the result of the reroute computation from the server.

Such an estimated cost can be computed very quickly and cheaply for multiple intermediate points, such as a2 and a4. Then an optimal reroute is selected from the plurality of computed reroutes and using guidance module 114, the driver is directed to the restoration route along the new optimal route.

In other embodiments, since the reroute is obtained in a short period of time after a detected deviation from the original route, the estimated cost of the new reroute is expected to be close to the cost of a portion of the original route from the point where deviation occurred. Since the original route is typically better optimized than the reroute, the estimated cost can be determined to be as unreliable if the estimated cost is much smaller than the corresponding part of the original route.

Because of the time required for routing module 112 to compute a reroute, it is possible that, once calculated, the driver has insufficient warning to make the recommend turn based upon the calculated optimal reroute. Therefore, instead of simply recommending a U-turn that may be both dangerous and stressful to the driver, a predetermined cost, higher than regular cost, is assigned to turns for a predefined distance d, wherein distance d depends on the vehicle speed and the time required for routing module 112 to compute a route.

In this manner, routing module 112 is operable for both initial routing and rerouting, choosing a less radial or "straighter" direction that people usually take when they are lost or in motion. For example, restoration route R1a would require a turn at point b1. However, because the distance from PDEV to point b1 is smaller than d, the turn at point b1 is assigned a cost that is higher than a normal turn cost, which would be used during regular routing from the current position to the destination PDEST if the vehicle were stationary at the current position. Therefore, based upon a scenario with additional intermediate points a3, a4, and multiple turn offs, e.g., point b2, restoration route R1a would most likely not be selected as the most optimal route. This is better than simply prohibiting U-turns, since in some cases U-turn may be the only possible solution.

Based upon such a "cost benefit" when rerouting or routing from a moving vehicle, a user is less likely to miss a required turn that is proposed too early by the routing module 112.

Furthermore, in some embodiments, processor 102 is operable to calculate multiple reroutes simultaneously, thereby shortening the time required to select an optimal reroute.

Figure 3:
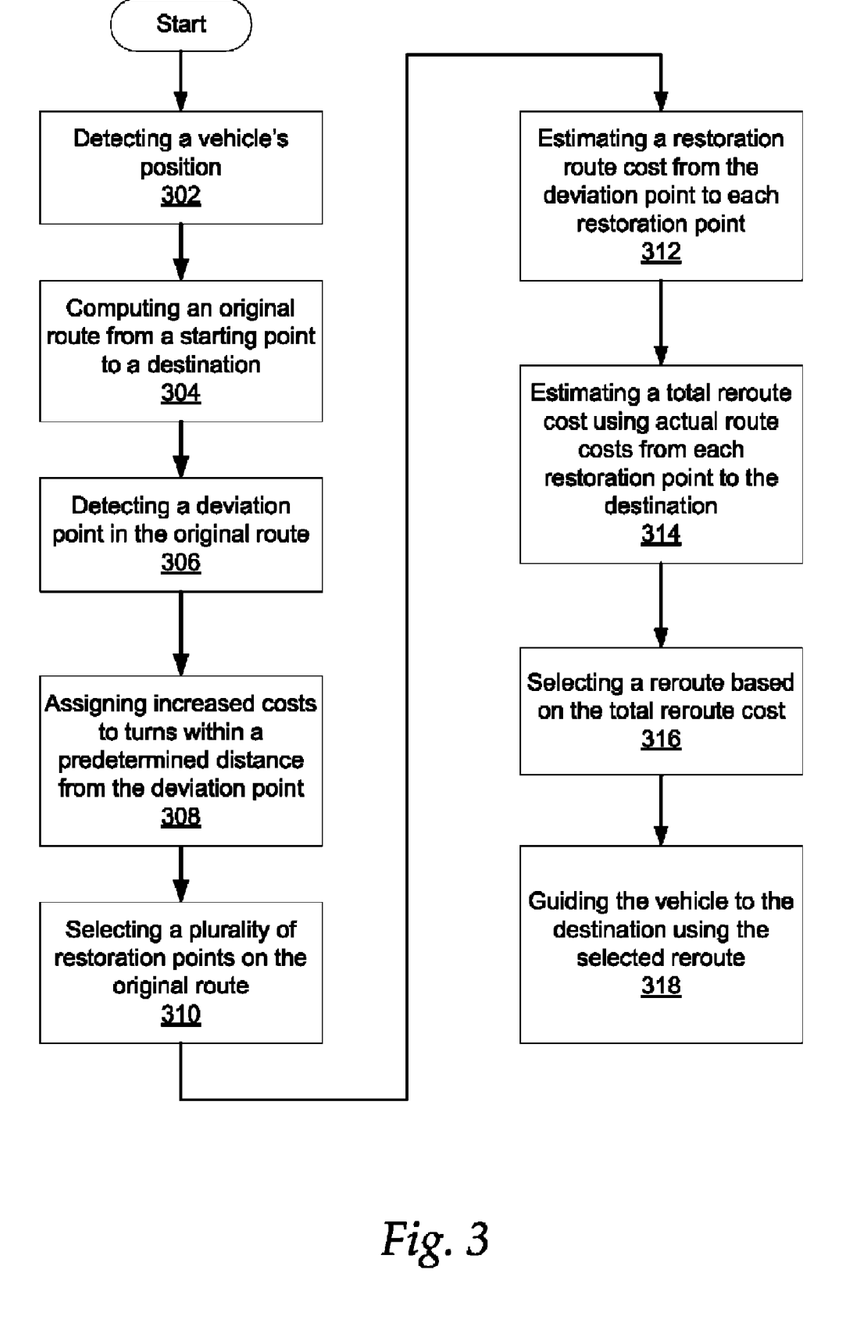
FIG. 3 illustrates one embodiment of a method to perform rerouting according to the system of FIG. 1.

FIG. 3 illustrates one embodiment of a method to determine a reroute after an off-route deviation, comprising first detecting a position of the vehicle at step 302.

At step 304, device 100 computes an original route for a vehicle from an original starting point to a destination.

At step 306, device 100 detects deviation from the original route and assigns, at step 308, increased costs to turns within a predetermined distance of the current point PDEV.

At step 310, device 100 is operable to select at least one intermediate point, e.g., a2, a3, and a4, on the original route PSTART–PDEST. Under normal circumstances the selection of intermediate points may be limited to intermediate points that lie on the original route between the point of deviation and the destination PDEV. However, in some situations, correcting a deviation, e.g., a planned detour, may require restoring the vehicle to a point on the original route that is before the deviation point.

At step 312, processor 102 performs the function of estimating a restoration route cost from the point PDEV to each intermediate point, a2, a3, and a4 using an increased cost assigned to turns within a predetermined distance d of PDEV. In some embodiments, the increased cost is predetermined. In other embodiments, the increased cost is calculated based upon the speed of the vehicle and/or the distance from the turn to PDEV.

At step 314, processor 102 estimates a total cost of each reroute from PDEV to the destination, wherein each estimated reroute cost comprises the estimated restoration route (PDEV to an intermediate point) cost plus an actual cost for the portion, e.g., R1b, R2b, or R3b, of the original route from the intermediate point, a2, a3, or a4, to the destination PDEST.

At step 316, processor 102 selects a reroute from the at least one reroute, based upon the cost of each reroute.

Using the selected reroute, at step 318, map guidance module 114 guides the driver to the destination based upon the selected reroute.

Accordingly, the embodiments herein disclosed provide a unified approach to routing, both from a stationary position as well as from a moving vehicle, and rerouting by incorporating native optimal cost/shortest distance approaches instead of explicitly prohibiting maneuvers, such as U-turns and turns within a predetermined distance of the vehicle.

Furthermore, the disclosed embodiments avoid cases where rerouting cannot find a valid path because restoration routes close to the deviation point, while expensive, are not explicitly prohibited.

In addition, because the optimal path encourages maintaining a "straight" heading even though the heading may be incorrect, the methods disclosed herein allows sufficient time for rerouting module 112 to calculate a route even when the current segment is short.

And further, because the route selection algorithm is based upon an estimate of each restoration route, the embodiments provide close to optimal partial rerouting without any sacrifice in speed of computing.

While the foregoing disclosure shows illustrative aspects and/or aspects, it should be noted that various changes and modifications could be made herein without departing from the scope of the described aspects and/or aspects as defined by the appended claims. Furthermore, although elements of the described aspects s described or claimed in the singular, the plural is contemplated unless limitation to the singular is explicitly stated. Additionally, all or a portion of any aspect and/or aspects may be utilized with all or a portion of any other aspect and/or aspect, unless stated otherwise.

What is claimed is:

1. A navigation device comprising:
    a processor;
    a map information storage medium storing map information;
    a position determining module configured to enable the processor to determine a current location, a velocity and direction of travel of a vehicle, and determine whether the current position is a deviation from an original route from a starting position to a destination;
    a routing module configured to enable the processor to determine the original route and a reroute from current location to the destination, the reroute comprising a restoration route from the current location to at least one intermediate point on the original route and then continuing to the destination;
    wherein the route module is further configured to enable the processor to estimate a reroute cost upon an estimated cost of the restoration route plus a predetermined actual cost of the route from the intermediate point to the final destination, and then select a reroute based upon the estimated reroute cost.

2. A navigation device according to claim 1, wherein said processor is configured to assign an increased cost to turns on the restoration route for a predetermined distance from the current location.

3. A navigation device according to claim 1, wherein the processor is configured to select a plurality of intermediate points at predetermined intervals on the original route.

4. A navigation device according to claim 1, wherein the route module is configured to determine an original route from the starting position to the destination.

5. A navigation device according to claim 1, wherein the map information storage medium comprises the predetermined actual route cost from each intermediate point to the destination.

6. A method of determining a reroute after an off-route deviation, comprising:
   detecting a position of the vehicle;
   computing an original route for a vehicle from a starting point to a destination;
   detecting a current location that indicates a deviation from the original route;
   assigning an increased cost to turns within a predetermined distance of the current location;
   selecting a plurality of intermediate points on the original route;
   estimating a restoration route cost from the current location to each intermediate point using the increased cost assigned to turns within a predetermined distance of the current location;
   estimating a total cost of each reroute from the current location to the destination, wherein each estimated reroute cost comprises the estimated restoration route cost plus an actual cost for the portion of the original route from the intermediate point associated with that reroute to the destination;
   selecting a reroute from the plurality of reroutes, based upon the cost of each reroute; and
   performing map guidance based upon the selected reroute.

7. The method of claim 6, further comprising calculating the predetermined distance based upon vehicle speed and a time required computing a reroute.

8. The method of claim 6, further comprising calculating multiple reroutes simultaneously.

9. The method of claim 6, further comprising selecting a reroute based upon a shortest distance.

10. The method of claim 6, further comprising selecting a reroute based upon a quickest route.

11. The method of claim 6, further comprising calculating each reroute based upon the MANHATTAN DISTANCE from the current location to the intermediate point associated with each reroute.

12. The method of claim 6, wherein selecting at least one intermediate point comprises selecting a intermediate point that is between a deviation point and the destination.

13. At least one processor configured to perform the actions of:
   detecting a position of the vehicle;
   computing an original route for a vehicle from a starting point to a destination;
   detecting a current location that is a deviation from the original route;
   assigning an increased cost to turns within a predetermined distance of the current location;
   selecting a plurality of intermediate points on the original route;
   estimating a restoration route cost from the current location to each intermediate point using the increased cost assigned to turns within a predetermined distance of the current location;
   estimating a total cost of each reroute from the current location to the destination, wherein each estimated reroute cost comprises the estimated restoration route cost plus an actual cost for the portion of the original route from the intermediate point associate with that reroute to the destination;
   selecting a reroute from the plurality of reroutes, based upon the cost of each reroute; and
   performing map guidance based upon the selected reroute.

14. A computer-readable medium comprising executable instructions stored thereon, comprising:
   a first set of instructions for causing a processor to detect a position of the vehicle;
   a second set of instructions for causing a processor to compute an original route for a vehicle from a starting point to a destination;
   a third set of instructions for causing a processor to detect a current location that is a deviation from the original route;
   a fourth set of instructions for causing a processor to assign an increased cost to turns within a predetermined distance of the current location;
   a fifth set of instructions for causing a processor to select at least one intermediate point on the original route;
   a sixth set of instructions for causing a processor to estimate a restoration route cost from the current location to each intermediate point using the increased cost assigned to turns within a predetermined distance of the current location;
   a seventh set of instructions for causing a processor to estimate a total cost of each reroute from the deviation route to the destination, wherein each estimated reroute cost comprises the estimated restoration route cost plus an actual cost for the portion of the original route from the intermediate point associate with that reroute to the destination;
   an eighth set of instructions for causing a processor to select a reroute from the at least one reroute, based upon the cost of each reroute; and
   a ninth set of instructions for causing a processor to perform map guidance based upon the selected reroute.

* * * * *